US009594949B1

United States Patent
Shreve et al.

(10) Patent No.: US 9,594,949 B1
(45) Date of Patent: Mar. 14, 2017

(54) HUMAN IDENTITY VERIFICATION VIA AUTOMATED ANALYSIS OF FACIAL ACTION CODING SYSTEM FEATURES

(71) Applicant: Xerox Corporation, Norwalk, CT (US)

(72) Inventors: Matthew Adam Shreve, Webster, NY (US); Jayant Kumar, Webster, NY (US); Qun Li, Webster, NY (US); Edgar A. Bernal, Webster, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 14/840,745

(22) Filed: Aug. 31, 2015

(51) Int. Cl.
    *G06K 9/62* (2006.01)
    *G06K 9/00* (2006.01)
    *G06K 9/52* (2006.01)

(52) U.S. Cl.
    CPC ..... *G06K 9/00315* (2013.01); *G06K 9/00288* (2013.01); *G06K 9/52* (2013.01); *G06K 9/6215* (2013.01)

(58) Field of Classification Search
    None
    See application file for complete search history.

(56) References Cited

U.S. PATENT DOCUMENTS

| 7,499,574 B1 * | 3/2009 | Yang | G06K 9/00275 382/118 |
| 2006/0115157 A1 * | 6/2006 | Mori | G06K 9/00221 382/190 |

OTHER PUBLICATIONS

Liu et al., Video-Based Face Recognition Using Adaptive Hidden Markov Models, 2003 IEEE Computer Society Conference on Computer Vision and Pattern Recognition (CVPR'03), IEEE Computer Society, 6 pages total.*

* cited by examiner

*Primary Examiner* — Brian P Werner (57) ABSTRACT

A method, computer readable medium and apparatus for verifying an identity of an individual based upon facial expressions as exhibited in a query video of the individual are disclosed. The method includes receiving a reference video for each one of a plurality of different individuals, wherein a plurality of facial gesture encoders is extracted from at least one frame of the reference video describing one or more facial expressions of each one of the plurality of different individuals, receiving the query video, calculating a similarity score for the reference video for the each one of the plurality of different individuals based on an analysis that compares the plurality of facial gesture encoders of the at least one frame of the reference video for the each one of the plurality of different individuals to a plurality of facial gesture encoders extracted from at least one frame of the query video.

20 Claims, 4 Drawing Sheets

HUMAN IDENTITY VERIFICATION VIA AUTOMATED ANALYSIS OF FACIAL ACTION CODING SYSTEM FEATURES

The present disclosure relates generally to human identity verification and, more particularly, to a method and apparatus for identifying an individual based upon facial expressions of a query video.

BACKGROUND

The human face serves as an important interface to convey nonverbal emotional information. The human face is probably the most natural characteristic that humans use to identify each other. Thus, the study on the potential use of the face as a biometrics trait has received significant attention in the search of new biometrics modalities in the past decades.

SUMMARY

According to aspects illustrated herein, there are provided a method, non-transitory computer readable medium and apparatus for verifying an identity of an individual based upon facial expressions as exhibited in a query video of the individual. One disclosed feature of the embodiments is a method that receives a reference video for each one of a plurality of different individuals, wherein a plurality of facial gesture encoders is extracted from at least one frame of the reference video describing one or more facial expressions of each one of the plurality of different individuals, receives the query video, calculates a similarity score for the reference video for the each one of the plurality of different individuals based on an analysis that compares the plurality of facial gesture encoders of the at least one frame of the reference video for the each one of the plurality of different individuals to a plurality of facial gesture encoders extracted from at least one frame of the query video and provides a ranking of a top N individuals of the plurality of different individuals based upon the similarity score that is calculated for the each one of the plurality of different individuals.

Another disclosed feature of the embodiments is a non-transitory computer-readable medium having stored thereon a plurality of instructions, the plurality of instructions including instructions which, when executed by a processor, cause the processor to perform operations that receives a reference video for each one of a plurality of different individuals, wherein a plurality of facial gesture encoders is extracted from at least one frame of the reference video describing one or more facial expressions of each one of the plurality of different individuals, receive the query video, calculate a similarity score for the reference video for the each one of the plurality of different individuals based on an analysis that compares the plurality of facial gesture encoders of the at least one frame of the reference video for the each one of the plurality of different individuals to a plurality of facial gesture encoders extracted from at least one frame of the query video and provide a ranking of a top N individuals of the plurality of different individuals based upon the similarity score that is calculated for the each one of the plurality of different individuals.

Another disclosed feature of the embodiments is an apparatus comprising a processor and a computer-readable medium storing a plurality of instructions which, when executed by the processor, cause the processor to perform operations that receive a reference video for each one of a plurality of different individuals, wherein a plurality of facial gesture encoders is extracted from at least one frame of the reference video describing one or more facial expressions of each one of the plurality of different individuals, receive the query video, calculate a similarity score for the reference video for the each one of the plurality of different individuals based on an analysis that compares the plurality of facial gesture encoders of the at least one frame of the reference video for the each one of the plurality of different individuals to a plurality of facial gesture encoders extracted from at least one frame of the query video and provide a ranking of a top N individuals of the plurality of different individuals based upon the similarity score that is calculated for the each one of the plurality of different individuals.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for verifying an identity of an individual based upon facial expressions as exhibited in a query video. As discussed above, the human face serves as an important interface to convey nonverbal emotional information. The human face is probably the most natural characteristic that humans use to identify each other. Thus, the study on the potential use of the face as a biometrics trait has received significant attention in the search of new biometrics modalities in the past decades.

Embodiments of the present disclosure provide a method for automatically verifying the identity of an individual based upon the similarities in facial expressions exhibited by the individual between a reference video and a query video using facial gesture encoders. An example facial gesture encoder that describes the various aspects of facial expression is the Facial Action Coding System (FACS), which provides a discrete scale of values that denote region and intensity of facial movements called Action Units (AU). An enrollment period may be used to collect reference videos of a plurality of different individuals. AU values may be extracted from at least one frame of each one of the reference videos. A query video may then be captured and AU values may be extracted from at least one frame of the query video. Then the AU values from the query video may be compared to each one of the AU values from the reference videos to obtain a similarity score of an identity verification of the individual. In one example, the ranking of the top N individuals associated with a similarity score above a threshold value may be presented.

In one embodiment, both the query and reference videos are captured while individuals are performing a specific task. In one example case, the method would continuously authenticate a user over the duration of specific task(s) during a single session, or specific task(s) that take place over separate sessions. Examples of such task(s) could include problem solving tasks (e.g., an exam, puzzle, game, questionnaire, and the like).

In one embodiment, the similarity score may be based on a fusion of multiple different scores. In one embodiment, two different scores may be used. The two different scores may be a distance metric between AU histograms of the query video and a reference video, or the two different scores may be a temporal similarity or dissimilarity score based on a temporal alignment of the sequence of AUs of the frames of the query video and the AUs of the frames of the reference video. In one embodiment, the temporal alignment can comprise a dynamic time warping (DTW) algorithm.

Figure 1:
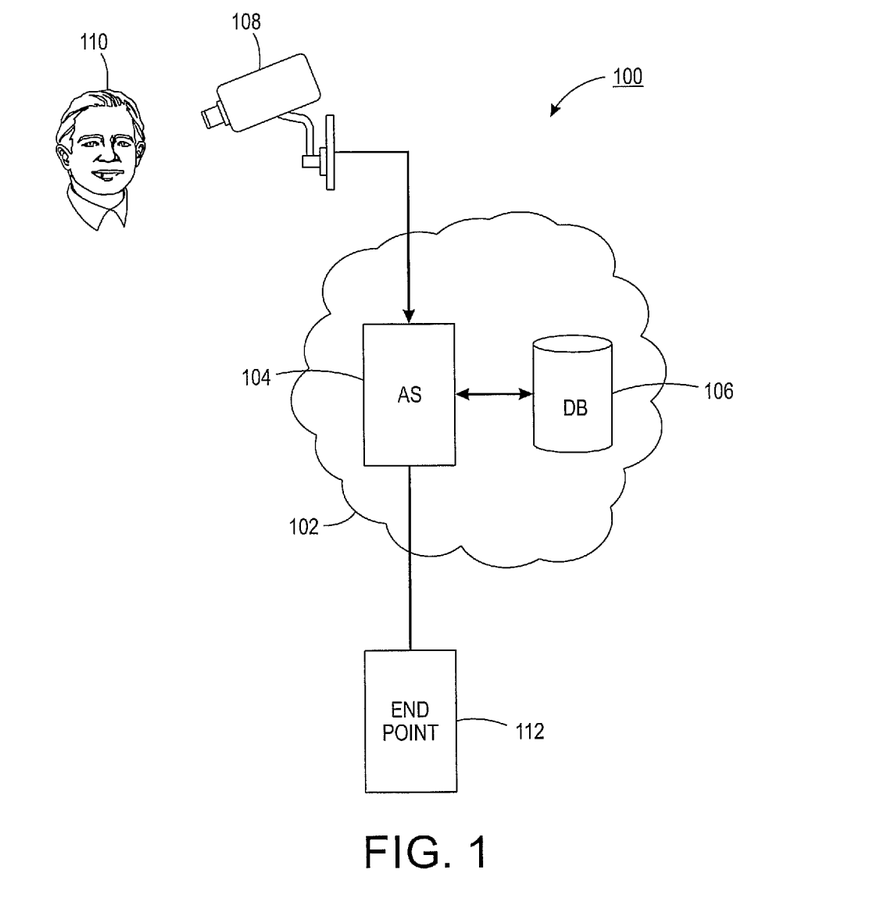
FIG. 1 illustrates an example block diagram of a system of the present disclosure.

FIG. 1 illustrates an example system 100 of the present disclosure. In one embodiment, the system 100 includes an Internet Protocol (IP) network 102. The IP network 102 may be any type of network including, for example, a cellular network, a broadband network, and the like.

It should be noted that the IP network 102 has been simplified for ease of explanation. The IP network 102 may include additional access networks or network elements that are not shown. For example, the additional network elements may include a gateway, a router, a switch, a firewall, an application server, and the like.

In one embodiment, the IP network 102 may include an application server (AS) 104 and a database (DB) 106. In one embodiment, the AS 104 may be deployed as a computer or a server having a processor and computer readable memory for storing instructions, which when executed by the processor perform the functions described herein. One example of a computer is discussed below and described in FIG. 4.

In one embodiment, the DB 106 may store the various functions, parameters and values used for performing the automated method for identifying an individual based upon facial expression of a query video described herein. The DB 106 may also store all of the reference videos and annotated AU values for at least one frame of each of the reference videos of different individuals, as discussed below.

Although only a single AS 104 and a single DB 106 are illustrated in FIG. 1, it should be noted that any number of application servers and databases may be deployed. In addition, the application servers and databases may be co-located or located remotely from one another.

In one embodiment, the system 100 may include a video camera 108. The video camera 108 may be located remotely from the AS 104 and the DB 106 or may be co-located with the AS 104 and the DB 106. In one embodiment, the video camera 108 may be coupled to an endpoint device (not shown) that is in communication with the AS 104 over the IP network 102. The video camera 108 may capture a reference video for each one of a plurality of different individuals.

In one embodiment, each reference video may comprise a plurality of frames and AU values may be extracted from at least one frame of the reference video. In one embodiment, the AUs may be in accordance with a FACS coding of facial expressions. In one embodiment, the AUs may be detected using a program such as FaceReader® 6, or any other program that extracts FACS features. In another embodiment, the AUs may be annotated by a trained human expert. Table 1 below illustrates an example of AUs associated with the FACS coding of facial expressions.

TABLE 1:

| AUS FOR FACS CODING | |
| --- | --- |
| AU | DESCRIPTION |
| 1 | Inner Brow Raiser |
| 2 | Outer Brow Raiser |
| 4 | Brow Lowerer |
| 5 | Upper Lid Raiser |
| 6 | Cheek Raiser |
| 7 | Lid Tightener |
| 9 | Nose Wrinkler |
| 10 | Upper Lip Raiser |
| 12 | Lip Corner Puller |
| 14 | Dimpler |
| 15 | Lip Corner Depressor |
| 17 | Chin Raiser |
| 18 | Lip Pucker |
| 20 | Lip Stretcher |
| 23 | Lip Tightener |
| 24 | Lip Pressor |
| 25 | Lips Part |
| 26 | Jaw Drop |
| 27 | Mouth Stretch |
| 43 | Eyes Closed |

In one embodiment, the present disclosure also assigns a value based on a range of values of a discrete scale. In other words, previous applications of the AUs would only assign a binary value (e.g., either the AU is on or off). In contrast, the present disclosure uses a degree of activation of each AU. For example, the discrete scale may be a numerical scale, an alphabetical scale, and the like. In one embodiment, the discrete scale may be a range of 0-6 where 0 is off and 6 is a maximum amount of activation. In another embodiment, the discrete scale may be a range of A-E where A=trace, B=slight, C=marked, D=severe, and E=maximum. In one embodiment, the values for the detected AUs may be assigned by an expert. The sequence of AUs extracted from the reference videos may then be sent to the AS 104 and stored in the DB 106. It should be noted that although AU values from a FACS coding is used, the embodiments of the present disclosure may work with any facial gesture encoders.

In one embodiment, an endpoint 112 may be located remotely from the camera 108 or co-located with the camera 108. The endpoint 112 may include a display and be used to verify the identity of an individual based upon a query video. In one embodiment, the camera 108 may be used to also capture the query video. Alternatively, another camera (not shown), similar to the camera 108, may be used to capture the query video.

For example, the reference videos may be collected during an enrollment phase at a first location using the camera 108. The query video may be taken at a second location that is being monitored with a second camera associated with the endpoint 112.

In one embodiment, the endpoint 112 may be any computing device with a display. For example, the endpoint 112 may be a desktop computer, a laptop computer, a tablet computer, a mobile telephone, a smart phone, and the like.

In one embodiment, the query video may also be sent to the AS 104 for processing to determine if the individual in the query video matches an individual in one of the reference videos. In one embodiment, AU values can be extracted from at least one frame of the query video. Then the sequence of AUs extracted from the frames of a query video may be compared to the sequence of AUs extracted from the frames of the reference video for each one of the plurality of different individuals.

In one embodiment, a similarity score may be calculated based upon the comparison. In one embodiment, the similarity score may have a value between 0 and 1.

In one embodiment, a ranking of a top N individuals may be displayed on the endpoint endpoint 112 based upon the similarity score. In one embodiment, the ranking of the top N individuals may be based on a number of the plurality of different individuals who have a similarity score above a threshold (e.g., 0.90).

In one embodiment, the similarity score may be based on a distance score that is calculated based upon a distance between the AU values of at least one frame of the reference video compared to the AU values of at least one frame of the query video.

In one embodiment, the similarity score may be based upon a score-level fusion that fuses the distance score to a temporal score. The temporal score may be based upon a temporal analysis of a sequence of the AUs in at least one frame of the query video compared to a sequence of the AUs in at least one frame of the reference video.

Figure 2:
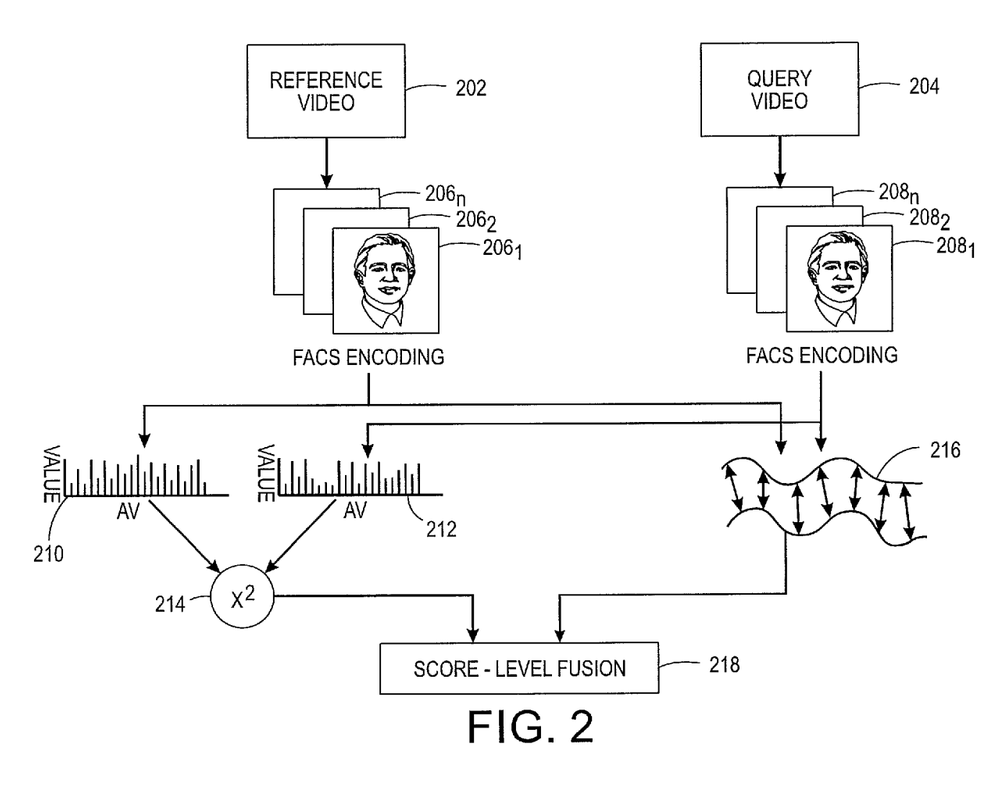
FIG. 2 illustrates a high-level block diagram of a method of the present disclosure.

FIG. 2 illustrates a high-level block diagram of a method of the present disclosure. FIG. 2 illustrates a reference video 202 and a query video 204. As discussed above, the reference video 202 and the query video 204 may comprise a plurality of frames $206_1$ to $206_n$ (herein referred to individually as frame 206 or collectively as frames 206) and a plurality of frames $208_1$ to $208_n$ (herein referred to individually as frame 208 or collectively as frames 208), respectively.

As discussed above, each one of the frames 206 and 208 may be analyzed to extract AUs, and a value of the amount of activation of the AUs may be assigned for each one of the detected AUs. In one embodiment, a histogram 210 of the values of each one of the AUs for at least one frame $206_1$ to $206_n$ and a histogram 212 of the values of each one of the AUs for at least one frame $208_1$ to $208_n$ may be created. In one embodiment, a distance function may be applied to the histograms 210 and 212 to calculate a distance score between the AU histogram for the frames $206_1$ to $206_n$ and the AU histogram for the frames $208_1$ to $208_n$.

In one embodiment, a 6-bin frequency histogram may be generated for each AU over all n frames as shown in Equations (1) and (2):

$$H_{AU_i}(j) = \Sigma_{f=1}^n \psi(AU_i(f), j),$$ Equation 1:

where i=1, 2, . . . , 20 is the AU index, $AU_i(f)$ is the value of the i-th AU (as per Table 1 above) corresponding to frame f, $$\psi(AU_i(f), j) = \begin{cases} 1 & \text{if } AU_i(f) = j \\ 0 & \text{otherwise} \end{cases},$$ Equation 2 and j is the histogram bin index that corresponds to one of the 6 AU intensity values. For a given video sequence of a given subject, all histograms are concatenated to create an overall histogram H of length 120 (e.g., 6×20) according to Equation (3):

$$H = \{H_{AU_1}, H_{AU_2}, \ldots, H_{AU_{20}}\}$$ Equation 3:

In one embodiment, a chi squared ($\chi^2$) distance function may be applied. It should be noted that any distance function may be applied. For example, a cosine distance function or any other distance or divergence function may be also applied.

In one embodiment, the similarity score may be based on only the distance function between the histograms. However, in one embodiment, the accuracy of the identify verification may be improved by fusing the distance score to a temporal score. In one embodiment, a temporal analysis may also be applied to the value of the AUs in the frames $206_1$ to $206_n$ and the AUs in the frames $208_1$ to $208_n$.

In one embodiment, the temporal analysis may be a dynamic time warping (DTW) function. The DTW function may apply a temporal warping of a sequence of the plurality of different AUs of at least one frame of the query video to align with a sequence of the plurality of different AUs of at least one frame of the reference video. An example is illustrated by the aligned sequence of AUs 216 illustrated in FIG. 2.

The distance score and the temporal score may be fused 218 to obtain the similarity score. In one embodiment, the distance score ($S_{FACS-H}$) may be fused with the temporal score ($S_{DTW}$) in accordance with Equation (4) below:

$$F(i,j) = \alpha S_{FACS-H}(i,j) + \beta S_{DTW}(i,j),$$ Equation 4:

where $\alpha$ and $\beta$ are weighting values having a real value between 0 and 1, where $\alpha + \beta = 1$. In one embodiment, the values of $\alpha$ and $\beta$ were found to be 0.38 and 0.62, respectively.

It should be noted that the above Equations (1)-(4) are only example equations or functions that may be used. In addition, the human identity verification may be performed with only a single distance score as the confidence score. In other words, embodiments of the present disclosure do not require that score-level fusion 218 be performed.

As discussed above, once the similarity score is calculated for each reference video compared to the query video, the ranking of the top N reference videos having the highest similarity scores may be presented to a user on the endpoint 112. In one embodiment, N may be based on a number of references videos having a similarity score above a threshold. For example, the threshold may be 0.95 and ten reference videos may have a similarity score above 0.95. Thus, N may be the top 10 reference videos associated with ten different individuals.

In one embodiment, N may be 1. In other words, it may be assumed that the top similarity score is the reference video having the identity of the individual in the query video.

Thus, embodiments of the present disclosure automatically perform human identify verification based on facial expressions captured in a query video. Values may be assigned to AUs in each frame 206 and 208 of the reference videos 202 and the query video 204, respectively, and the AU values may be compared between the reference videos 202 and the query video 204 to obtain a similarity score that identifies the individual in the query video based on a facial expression match with an individual in the reference video.

Figure 3:
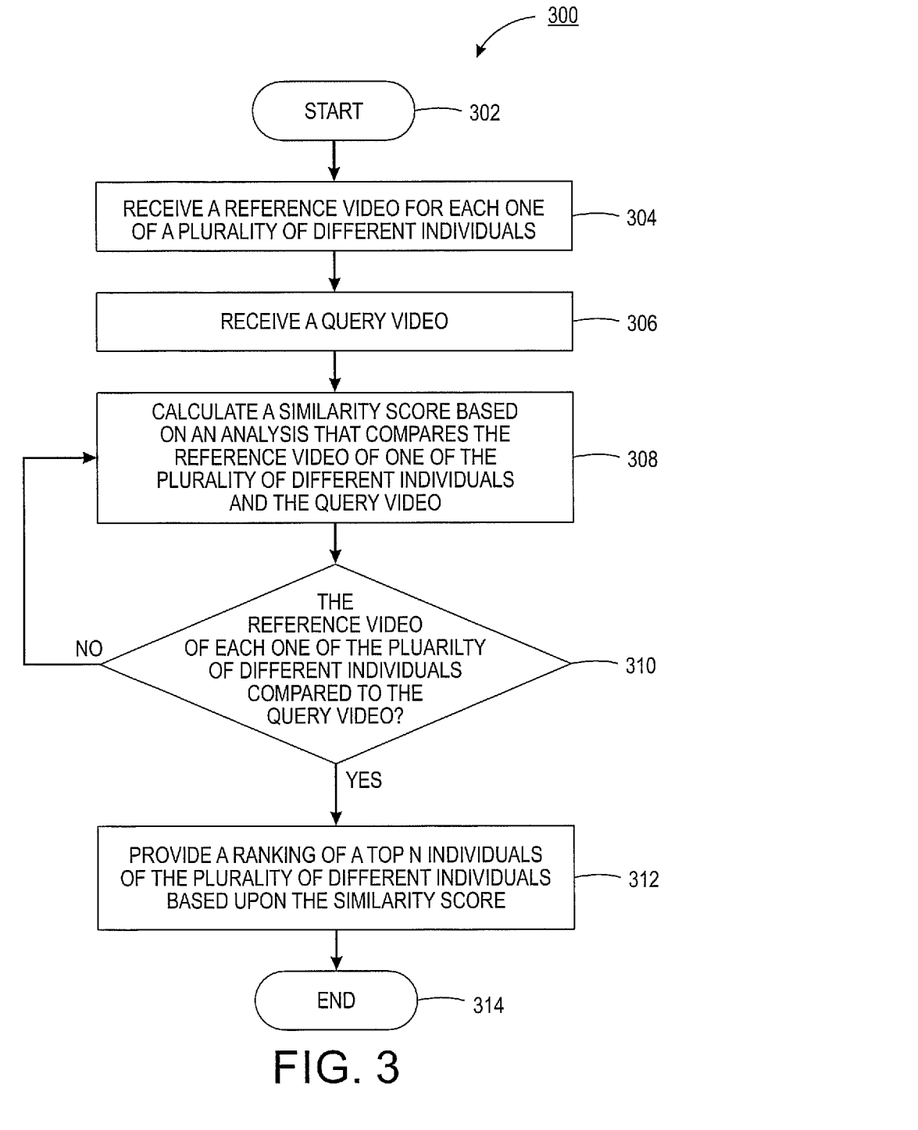
FIG. 3 illustrates an example flowchart of a method for verifying an identify of an individual based upon facial expressions as exhibited in a query video.
Figure 4:
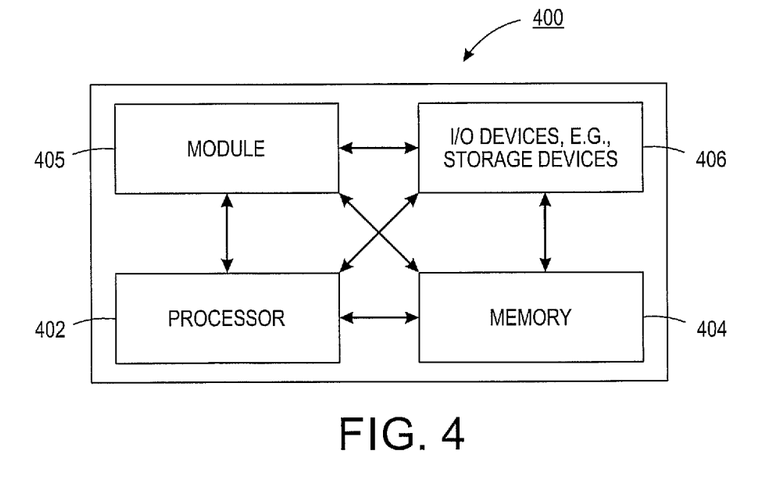
FIG. 4 illustrates a high-level block diagram of a computer suitable for use in performing the functions described herein.

FIG. 3 illustrates a flowchart of a method 300 for verifying the identity of an individual based upon facial expressions as exhibited in a query video. In one embodiment, one or more steps, or operations, of the method 300 may be performed by the application server 104 or a computer as illustrated in FIG. 4 and discussed below.

At block 302 the method 300 begins. At block 304, the method 300 receives a reference video for each one of a plurality of different individuals. For example, an enrollment period may allow a reference video for each one of the plurality of different individuals to be captured.

Each reference video may comprise a plurality of frames. At least one frame of the reference video may be annotated with a plurality of different AUs. The AUs may be in accordance with a FACS encoding.

In one embodiment, a value may be assigned for each one of the different AUs based on a discrete scale comprising three or more incremental values. In other words, the discrete scale does not include only on or off. Rather, the AU may be assigned a value that indicates an amount or a degree of activation of a particular AU. The process may be repeated for each reference video of each one of the plurality of different users.

For example, the discrete scale may be a numerical scale, an alphabetical scale, and the like. In one embodiment, the discrete scale may have a range of three or more values. In one embodiment, the discrete scale may be a range of 0-6 where 0 is off and 6 is a maximum amount of activation. In another embodiment, the discrete scale may be a range of A-E where A=trace, B=slight, C=marked, D=severe, and E=maximum. In one embodiment, the values for the detected AUs may be assigned by an expert.

At block 306, the method 300 receives a query video. For example, an entrance to a building or a room may be monitored to ensure only authorized personnel are allowed to enter. Alternatively, a device may be secured to allow only authorized individuals to access the device. A camera at the location or the device may capture the query video. The same camera that captured the reference video may be used or a different camera may be used.

In one embodiment, the query video may comprise a plurality of frames. AU values corresponding to a plurality of different AUs may be extracted from at least one frame of the query video. In one embodiment, a value may be assigned for each one of the different AUs for at least one frame of the query video based on a discrete scale comprising three or more incremental values.

At block 308, the method 300 calculates a similarity score based on an analysis that compares the reference video of one of the plurality of different individuals and the query video. In one embodiment, the similarity score may be a value between 0 and 1 (e.g., a decimal value).

In one embodiment, the similarity score may be based on a similarity of value of the AUs in at least one frame of the reference video compared to the value of the AUs in at least one frame of the query video. In one embodiment, the similarity may be measured based upon distance score calculated by applying a distance function between a first histogram of the values for each one of the plurality of AUs of at least one frame of the reference video and a second histogram of the values for each one of the plurality of AUs of at least one frame of the query video.

In one embodiment, any type of distance function may be used (e.g., a chi squared ($\chi^2$) distance function, a cosine distance function, a divergence function and the like). In one embodiment, the Equations (1)-(3) described above may be used to create the first and second histograms.

In one embodiment, the distance score may be fused with a temporal score to obtain the similarity score. For example, a score level fusion may be applied for the distance score and the temporal score as described in Equation (4) above. As discussed above, the temporal score may be obtained by applying a temporal analysis between a sequence of the plurality of different AUs of at least one frame of the reference video and a sequence of the plurality of different AUs of at least one frame of the query video.

In one embodiment, the temporal analysis may include a DTW function. In one embodiment, the DTW function applies a temporal warping of the sequence of the plurality of different AUs of at least one frame of the query video to align with the sequence of the plurality of different AUs of at least one frame of the reference video. In one embodiment, fusing the distance score and the temporal score may provide a higher similarity score or a more accurate human identity verification.

At block 310, the method 300 determines if the reference video of each one of the plurality of different individuals was compared to the query video. In other words, the sequence of AU values extracted from the query video is compared against each sequence of AU values extracted from the reference video of each one of the plurality of different individuals. Thus, if there are 100 reference videos that each corresponds to a different one of 100 individuals, then the sequence of AU values extracted from the query video are compared to each one of the sequence of AU values extracted from the 100 reference videos.

If the answer to block 310 is no, then the method 300 returns to block 308. Blocks 308 and 310 may be repeated until all of the reference videos have been compared to the query video to calculate a similarity score for each reference video when compared to the query video.

If the answer to block 310 is yes, then the method 300 proceeds to block 312. At block 312, the method 300 provides a ranking of a top N individuals of the plurality of different individuals based upon the similarity score. In one embodiment, N may be based on a number of references videos having a similarity score above a threshold. For example, the threshold may be 0.95 and ten reference videos may have a similarity score above 0.95. Thus, N may be the top 10 reference videos associated with ten different individuals.

In one embodiment, N may be 1. In other words, it may be assumed that the top similarity score is the reference video having the identity of the individual in the query video. At block 314 the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer or a device. For example, the functioning of a computer may be improved to automatically identify an individual based upon facial expressions of a query video. In other words, biometric identity verification may be performed using facial expressions, as described herein. In addition, the embodiments of the present disclosure transform video data into annotated sequences of AU values that are used for identity verification of an individual, as discussed above. Notably, no previous machine or computer was capable of performing the functions described herein as the present disclosure provides an improvement in the technological arts of biometric identity verification.

FIG. 4 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to provide automatic identification of an individual based upon facial expressions of a query video, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for verifying an identity of an individual based upon facial expressions as exhibited in a query video, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for verifying an identity of an individual based upon facial expressions as exhibited in a query video (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for verifying an identity of an individual based upon facial expressions as exhibited in a query video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for verifying an identity of an individual based upon facial expressions as exhibited in a query video of the individual, comprising:
    receiving, by a processor, a reference video for each one of a plurality of different individuals, wherein a plurality of facial gesture encoders is extracted from at least one frame of the reference video describing one or more facial expressions of each one of the plurality of different individuals;
    receiving, by the processor, the query video;
    calculating, by the processor, a similarity score for the reference video for the each one of the plurality of different individuals based on an analysis that compares a plurality of different action units (AU) values of the at least one frame of the reference video for the each one of the plurality of different individuals to a plurality of different AU values extracted from at least one frame of the query video; and
    providing, by the processor, a ranking of a top N individuals of the plurality of different individuals based upon the similarity score that is calculated for the each one of the plurality of different individuals.

2. The method of claim 1, wherein the reference video and the query video are captured while the plurality of different individuals is preforming at least one task.

3. The method of claim 2, wherein the at least one task comprises a problem solving task.

4. The method of claim 1, wherein each one of the plurality of facial gesture encoders comprises different action unit values in accordance with a Facial Action Coding System (FACS) of facial expressions.

5. The method of claim 1, wherein the analysis to calculate the similarity score comprises applying a distance function between a first feature representation of the plurality of facial gesture encoders of the at least one frame of the reference video for the each one of the plurality of individuals and a feature representation of the plurality of facial gesture encoders of the at least one frame of the query video.

6. The method of claim 5, wherein the feature representation of the plurality of facial gesture encoders of the at least one frame of the reference video and the feature representation of the facial gesture encoders of the at least one frame of the query video comprise a histogram of the plurality of facial gesture encoders.

7. The method of claim 5, wherein the distance function comprises at least one of: a chi squared ($\chi^2$) distance function, a cosine distance function or a divergence metric.

8. The method of claim 5, wherein the analysis further comprises a temporal analysis between a sequence of the plurality of different action units of the at least one frame of the reference video for the each one of the plurality of individuals and a sequence of the plurality of different action units of the at least one frame of the query video.

9. The method of claim 8, wherein the temporal analysis comprises a dynamic time warping function that applies a temporal warping of the sequence of the plurality of different action units of the at least one frame of the query video to align with the sequence of the plurality of different action units of the at least one frame of the reference video for the each one of the plurality of different individuals.

10. The method of claim 8, wherein the similarity score comprises a fusion between a weighted score from the distance function and a weighted score from the temporal analysis.

11. The method of claim 1, wherein the ranking of the top N individuals comprises the plurality of individuals having the similarity score above a threshold value.

12. A non-transitory computer readable medium for storing instructions, which when executed by a processor, perform operations for verifying an identity of an individual based upon facial expressions as exhibited in a query video of the individual, the operations comprising:
    receiving a reference video for each one of a plurality of different individuals, wherein a plurality of facial gesture encoders is extracted from at least one frame of the reference video describing one or more facial expressions of each one of the plurality of different individuals;
    receiving the query video;
    calculating a similarity score for the reference video for the each one of the plurality of different individuals based on an analysis that compares the plurality of facial gesture encoders of the at least one frame of the reference video for the each one of the plurality of different individuals to a plurality of facial gesture encoders extracted from at least one frame of the query video; and
    providing a ranking of a top N individuals of the plurality of different individuals based upon the similarity score that is calculated for the each one of the plurality of different individuals.

13. The non-transitory computer readable medium of claim 12, wherein the reference video and the query video are captured while the plurality of different individuals is preforming at least one task.

14. The non-transitory computer readable medium of claim 12, wherein the at least one task comprises a problem solving task.

15. The non-transitory computer readable medium of claim 12, wherein each one of the plurality of facial gesture encoders comprises different action unit values in accordance with a Facial Action Coding System (FACS) of facial expressions.

16. The non-transitory computer readable medium of claim 12, wherein the analysis to calculate the similarity score comprises applying a distance function between a first feature representation of the plurality of different AU values of the at least one frame of the reference video for the each one of the plurality of individuals and a feature representation of the plurality of facial gesture encoders of the at least one frame of the query video.

17. The non-transitory computer readable medium of claim 16, wherein the distance function comprises at least one of: a chi squared ($\chi^2$) distance function, a cosine distance function or a divergence metric.

18. The non-transitory computer readable medium of claim 16, wherein the analysis further comprises a temporal analysis between a sequence of the plurality of different action units of the at least one frame of the reference video for the each one of the plurality of individuals and a sequence of the plurality of different action units of the at least one frame of the query video.

19. The non-transitory computer readable medium of claim 16, wherein the temporal analysis comprises a dynamic time warping function that applies a temporal warping of the sequence of the plurality of different action units of the at least one frame of the query video to align with the sequence of the plurality of different action units of the at least one frame of the reference video for the each one of the plurality of different individuals.

20. A method for verifying an identity of an individual based upon facial expressions as exhibited in a query video of the individual, comprising:
    creating, by a processor, a reference video describing one or more facial expressions of each one of a plurality of different individuals, wherein at least one frame of the reference video for the each one of the plurality of different individuals is annotated with a reference value for each one of a plurality of different action units;
    receiving, by the processor, the query video;
    annotating, by the processor, at least one frame of the query video with a query value for each one of the plurality of action units of the at least one frame of the query video;
    calculating, by the processor, a chi squared distance score between a first histogram of the reference values of the plurality of different action units of the at least one frame of the reference video for the each one of the plurality of individuals and a second histogram of the query values of the plurality of different action units of the at least one frame of the query video;
    calculating, by the processor, a temporal score based upon a dynamic time warping of a sequence of the plurality of different action units of the at least one frame of the query video to align with a sequence of the plurality of different action units of the at least one frame of the reference video for the each one of the plurality of different individuals;
    applying, by the processor, a first weight to the chi squared distance score to obtain a weighted chi squared distance score and a second weight to the temporal score to obtain a weighted temporal score;
    fusing, by the processor, the weighted chi squared distance score and the weighted temporal score to calculate a similarity score; and
    providing, by the processor, a ranking of a top N individuals of the plurality of different individuals based upon the similarity score that is calculated for the each one of the plurality of different individuals.

* * * * *